March 17, 1964     W. J. CLARK     3,124,960

PRESSURE RESPONSIVE MOTOR

Filed March 2, 1961

INVENTOR.
WENDALL J. CLARK

BY Stowell & Stowell

ATTORNEYS

United States Patent Office 3,124,960
Patented Mar. 17, 1964

3,124,960
PRESSURE RESPONSIVE MOTOR
Wendall J. Clark, Henrico County, Va., assignor to Texaco Experiment Incorporated, Richmond, Va., a corporation of Virginia
Filed Mar. 2, 1961, Ser. No. 92,978
2 Claims. (Cl. 73—410)

This invention relates to improvements in pressure responsive motor means.

It is a particular object of the present invention to provide a pressure responsive motor useful in conjunction with motion sensing means for determining the maximum altitude reached by air traveling vehicles and/or for actuating at maximum attainable altitudes instruments for sensing, transmitting and/or recording air temperatures, barometric pressures and humidity and means for obtaining air samples and/or means for discharging chaff, light-reflecting metal particles, while or colored smoke, etc. to provide visual observation of wind direction and/or wind speed and the like.

These and other objects and advantages are provided by a pressure responsive motor comprising wall means forming a closed chamber, at least one wall of said chamber being movable in response to ambient pressure variations, an opening through the wall means, and differential pressure responsive valve means for the opening to restrict flow of pressure fluid in one direction and permit flow of pressure fluid in the other direction.

The novel features of the pressure responsive motor will be more apparent to those skilled in the art from the following detailed description of the invention with reference to the accompanying drawings wherein.

Figure 1:
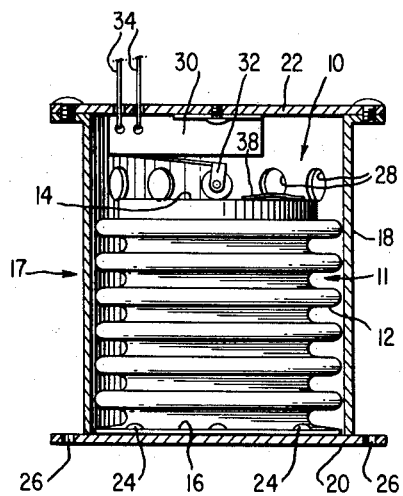
FIG. 1 is a vertical view in partial section of a pressure responsive motor and motion sensing means constructed in accordance with the teachings of the present invention with the valve means in the open position.

Referring to the drawings and in particular to FIGS. 1 through 4, the pressure responsive motor generally designated 10 is illustrated as including an expansible element 11 having a metallic bellows type side wall 12, a rigid top 14 and an air tight base 16.

While the illustrated expansible element 11 is of the metallic bellows type, other forms of the expansible element may be employed, such as a conventional diaphragm type structure.

The pressure responsive motor 10 is mounted in a housing 17 having side wall 18, bottom wall 20 and top wall 22. The inner diameter of the side wall 18 of the housing is of a size to snugly receive the bellows type side wall 12 of the expansible element 11 to confine the movement of the pressure responsive motor to movement along the vertical axis of the illustrated device. The base portion 16 of the expansible element is secured, such as by welding or rivets 24, to the base 20 of the housing. The base 20 of the housing may also be provided with openings 26 whereby the housing may be secured in a rocket, an aircraft, a balloon or other air traveling vehicle.

Generally, the pressure responsive motor 10 is oriented in the air traveling vehicle with the axis of movement of the expansible element perpendicular to the line of flight to prevent operation due to acceleration forces.

The interior of the housing 17, in the illustrated form of the invention, is connected to ambient pressure through a plurality of openings 28 in the side wall 18. However, it will be apparent that where the pressure responsive motor is installed in the interior of an air traveling vehicle, the interior of the housing 17 may be connected to ambient air through suitable conduits extending from the housing 17 to an opening in an outside wall of the carrying vehicle.

In the illustrated form of the invention, the top 22 of the housing 17 supports a conventional electric switch 30 having a switch actuating arm 32 which is in contact with the top 14 of the expansible element 11 when the pressure within the chamber of the expansible element 11 is equal to the pressure in housing 17. The switch 30 is provided with a pair of conventional electrical conductors 34 which may extend to a source of power and to further motor means, indicators, solenoids and the like.

Figure 3:
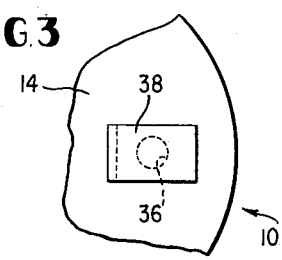
FIG. 3 is an enlarged fragmentary top view of the valve means for the pressure responsive motor shown in FIGS. 1 and 2.
Figure 4:
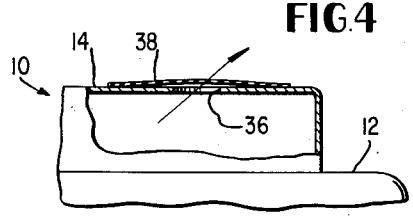
FIG. 4 is an enlarged fragmentary detailed view of the flap valve of the device shown in FIGS. 1, 2 and 3.

The top 14 of the pressure responsive motor 10 has an opening 36 therethrough as more clearly shown in FIGS. 3 and 4 of the drawings. The opening 36 is provided with a resilient or flexible cover or flap 38 which has dimensions substantially larger than the opening 36 and which is attached to the top 14 of the pressure responsive motor means 10 with a portion of at least one of the peripheral edges of the flexible member 38 unattached to the upper surface of the top 14 whereby the flexible member 38 cooperating with the opening 36 provides a differential pressure responsive flap valve for the pressure responsive motor 10 with the valve permitting substantially unrestricted flow of pressure fluid from the chamber defined by the expansible element 11 while restricting flow of pressure fluid in the opposite direction.

Figure 2:
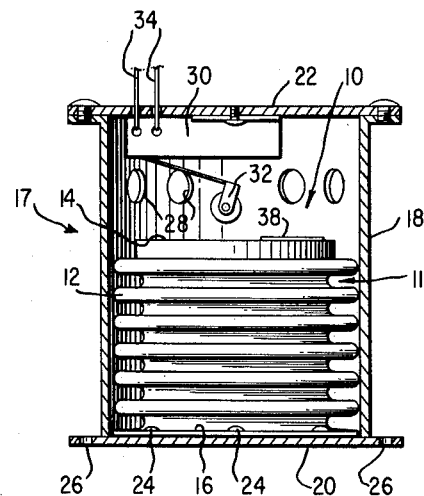
FIG. 2 is a vertical sectional view of the device shown in FIG. 1 with the valve means in the closed position and the movable wall of the motor means displaced relative to the motion sensing structure.

When the pressure within the expansible element is greater than the pressure outside thereof, air lifts the flexible flap 38 of the valve whereby the pressure within the expansible element is maintained substantially equal to the external pressure as long as the pressure responsive motor is passing through a decreasing pressure zone. As soon as the pressure responsive motor enters a zone wherein the external pressure is greater than the pressure within the expansible element, the external pressure presses inwardly on the flexible sheet 38 blocking the opening 36. As long as the external pressure is greater than the internal pressure, the valve will be maintained in the closed position and the external pressure will cause the bellows type side walls to collapse as illustrated in FIG. 2, permitting the switch lever arm 32 to move downwardly and to open or close the contacts of switch 30.

As hereinabove discussed, the flap valve maintains the pressure within the expansible element equal to the ambient pressure as long as the device is in a constant pressure zone or passing through a lower pressure zone while as soon as the pressure responsive motor 10 enters a zone of higher pressure, the valve closes and remains in the closed position as long as the external pressure is greater than the internal pressure. It is to be particularly noted, however, that the flap valve form of construction will maintain the internal pressure within the expansible element equal to ambient pressure when the change in the ambient pressure is a long term change such as normally occurs in the barometric pressure by normal changes in the weather as it requires a rather rapid change in pressure to provide a seal between the flap 38 and the opening 36.

Operation

In operation of the pressure responsive motor, for example, to open a parachute access door of a rocket such as disclosed in United States patent application Serial No. 71,101, filed November 22, 1960, by V. M. Barnes, Jr. et al., after the rocket has ascended to maximum altitude to permit recovery of the rocket, the housing 17 is attached within the instrument compartment of the rocket with ambient air in communication with the interior of the housing. The switch 30 is suitably connected to motor means and a source of power for actuating the release mechanism for the parachute door. Prior to launching the rocket, the relationship between the top 14 of the expansible element 11 and the switch arm 32 is as illustrated in FIG. 1. After the rocket is launched and is traveling upwardly into a less dense atmosphere, the relationship between the switch, the switch arm and the top 14 of the expansible element remains the same as the pressure within the pressure responsive motor 10 lifts the flap 38 of the flap valve structure maintaining the pressure within the device substantially at ambient pressure. As soon as the carrying rocket reaches maximum altitude and starts to descend, the ambient pressure increases above the pressure within the expansible element 11, thereby holding the flap member 38 of the flap valve structure against the opening 36. The increase in pressure urges the top 14 of pressure responsive motor 10 toward the base 20, thus moving the top 14 away from the switch 30 and permitting the switch lever arm 32 to move downwardly, closing the switch which, in turn, actuates motor means to release the parachute door.

The pressure responsive motor 10 remains in the contracted position as long as the ambient pressure remains above the pressure within the expansible element 11. To re-set the pressure responsive motor, the flap valve is lifted to equalize the pressure within the expansible element 11 with the ambient pressure.

Figure 5:
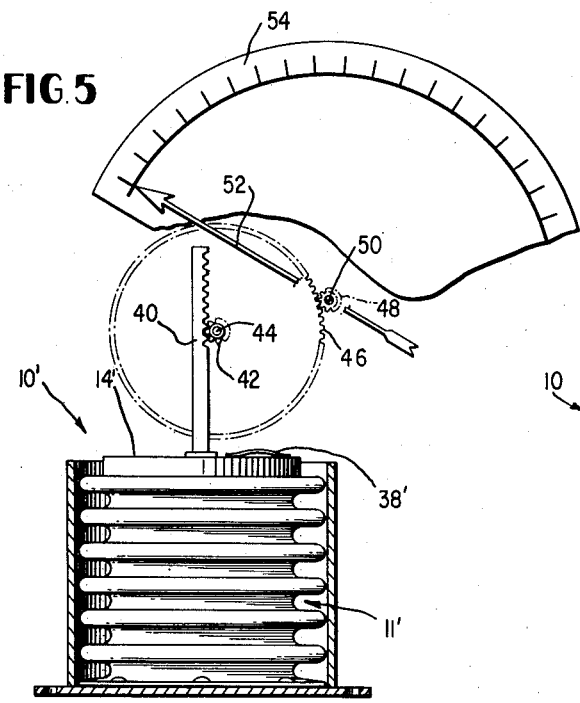
FIG. 5 is a diagrammatic view in partial section of the device of the invention employing as the motion sensing device means for indicating the maximum altitude reached by an air traveling vehicle.

Referring to FIG. 5 of the drawings, there is shown an application of the improved pressure responsive motor as applied to a maximum altitude recording instrument. In this form of the invention, the top 14' of the pressure responsive motor 10' has secured thereto a rack 40 which engages a toothed pinion 42 carried by a shaft 44. The shaft 44 also has mounted thereto a large gear 46 which, in turn, meshes with a small pinion 48 mounted to a shaft 50. The shaft 50 has secured thereto an indicator needle 52 which indicator needle has a pointer cooperating with a scale 54 having a zero position at the extreme left side.

In operation of the maximum altitude determining device, the mechanism is mounted in, for example, a rocket with the external surface of the expansible element 11' in communication with ambient air. As the rocket ascends, the flap valve structure 38' maintains the pressure within the expansible element the same as the ambient air pressure whereby the rack and its associated structures remain at the position illustrated in the drawing. As soon as the rocket attains maximum altitude and begins to return, the ambient pressure becomes greater than the pressure within the expansible element 11', thereby urging inwardly the flap 38' of the flap valve structure. The increase in external pressure over the pressure within the expansible element 11' causes the expansible element to collapse, moving the rack 40 downwardly and the indicator needle 52 to the right. The movement of the needle 52 across the scale 54 corresponds to the change in altitude from the time the flap 38 is maintained by the external pressure in the closed position whereby upon recovery of the rocket it is possible to read directly the maximum altitude which was reached by the device.

From the foregoing detailed description of the improved pressure responsive motor, it will be seen that the aims and objects of the invention have been fully accomplished. While particular embodiments and methods of operation of the present invention have been disclosed for purposes of illustration, it will be apparent to those skilled in the art that various modifications may be made in the form of the device without departing from the scope of the invention as defined in the appended claims.

I claim:

1. A pressure responsive motor comprising wall means forming a closed chamber, at least one wall of said chamber being movable in response to external ambient pressure variations, an opening through the wall means, differential pressure responsive valve means for said opening to restrict flow of ambient pressure fluid therethrough in one direction and permit flow of ambient pressure fluid in the other direction, and motion sensing means, and means mounting said motion sensing means in the path of travel of said one movable wall of the chamber.

2. The pressure responsive motor defined in claim 1 wherein the differential pressure responsive valve means comprises a flexible flap connected to said wall and extending over said opening, and said flexible flap permits the flow of pressure fluid from said chamber and restricts the flow of pressure fluid into said chamber.

References Cited in the file of this patent
UNITED STATES PATENTS

| | | |
|---|---|---|
| 1,424,461 | Frankforter | Aug. 1, 1922 |
| 1,462,109 | Hopkins | July 17, 1923 |
| 2,983,287 | Keetch | May 9, 1961 |